United States Patent

[11] 3,609,725

[72] Inventor Richard C. Simonsen
Ventura, Calif.
[21] Appl. No. 888,323
[22] Filed Dec. 29, 1969
[45] Patented Sept. 28, 1971
[73] Assignee Burroughs Corporation
Detroit, Mich.

[54] VARIABLE PHASE CLOCK FOR RECOVERY OF DATA
20 Claims, 5 Drawing Figs.

[52] U.S. Cl. 340/174.1 B, 179/100.2 R, 340/174.1 H
[51] Int. Cl. G11b 5/02, G11b 27/10
[50] Field of Search 340/174.1 B, 174.1 A, 174.1 H; 179/100.2 S

[56] References Cited
FOREIGN PATENTS
809,849 3/1959 Great Britain 340/174.1 B
OTHER REFERENCES
Hall; James R. Tape Skew Corrector, RCA Technical Notes No. 203; Jan. 5, 1959, Class 340, Subclass 174.1 B.

*Primary Examiner*—Bernard Konick
*Assistant Examiner*—Gary M. Hoffman
*Attorney*—Christie, Parker & Hale

ABSTRACT: A system for producing a clock pulse train of prescribed phase relative to a data pulse pattern. circuit generates a phase signal indicative of the relative phase between a reference timing pulse train and the data pulse pattern. Each reference pulse triggers an adjustable delay pulse generator which is controlled by the phase signal so that it produces pulses at the prescribed phase.

INVENTOR.
RICHARD C. SIMONSEN
BY
Christie, Parker & Hale
ATTORNEYS

VARIABLE PHASE CLOCK FOR RECOVERY OF DATA

BACKGROUND OF THE INVENTION

This invention relates to data handling, and, more particularly, to the generation of a clock pulse train for timing the recovery of data from a rotating disc file system.

Data handling systems frequently use time varying signals in the form of pulse patterns to represent items of information. Such pulse patterns can be considered to be divided into regularly spaced intervals called bit cells. The frequency of occurrence of these bit cells is called the data rate of the pulse pattern. Synchronizing pulses occur occasionally within the pattern to identify the start of designated groups of bit cells. No synchronizing pulses are provided for identifying the start of bit cells occurring within the group because such pulses consume time which can be more efficiently used for the transmission of information. Since each bit cell within the pulse pattern contains a specific item of information, the pattern can be properly interpreted only if means are provided for distinguishing one bit cell from another.

Clock pulse trains are generated as a means for separating the items of information. If the pulses within the clock pulse train are properly spaced, they can serve as markers to divide the pattern into bit cells. Proper spacing can be effected by generating the clock pulse train at the same frequency as the data rate of the pulse pattern. Circuits responsive to the clock pulses sample the pulse pattern once during each bit cell to effect the recovery of data therefrom.

Frequently, because of noise and other factors, the shape of the pulse pattern is not uniform during the bit cell. Typically, the pulse level at the center of the bit cell more accurately represents the item of information contained therein then does the level at other times. In that event, it becomes an important goal to sample the pulse pattern as close as possible to the center of the bit cell. While frequency control of the clock pulse train can assure that the sampling pulses are spaced at the same interval as the bit cells of the data pulse pattern, it cannot assure that the pulse pattern will be sampled at the center of the bit cell. Only if the relative phase between the clock pulse train and the pulse pattern is controlled can this goal be achieved.

The problem of controlling the phase of the clock pulse train is particularly serious in the recovery of data from disc file systems.

A magnetic disc file is described in Gleim et al., U.S. Pat. No. 3,375,507, which issued on Mar. 26, 1968, and is assigned to the same assignee as the present invention. The disc file system described in the referenced patent incorporates information tracks for the storage of binary data and clock tracks for the storage of reference timing bits. During operation, trains of pulses are derived from the storage tracks. Reference timing pulses derived from the clock tracks are regularly spaced; this spacing is hereafter referred to as a bit period. Pulse patterns derived from the information tracks define items of data during bit cell periods. Each item of stored data can be recovered by clocking the pulse pattern at an appropriate time during the bit cell period. Each clock track produces a pulse train suitable for controlling the clocking of the data pattern derived from an associated zone of information tracks.

Accurate recovery of stored data in a disc file system usually requires that the data pattern be clocked at the center of a bit cell. Unfortunately, the reference timing pulses cannot directly clock the data pattern because the reference timing pulses are asynchronous relative to the data patterns of the associated information tracks. For example, the data patterns may become shifted in phase relative to the reference timing pulses because of factors such as disc jitter, temperature changes, head skew, and head gap variation, as well as other unpredictable factors which cannot be wholly eliminated from a disc file system. In order to compensate for this asynchronous relationship it is necessary, when reading, to use the reference timing pulses to generate other pulses that will occur as close as possible to the center of the bit cell. The prior art systems commonly use digital techniques to generate a multiplicity of pulse trains, commonly denoted clock phases, for clocking the data. These clock phases are at the same frequency but are displaced in phase from one another by discrete amounts. For example, some prior art systems employ a clock track yielding a number of pulses per bit cell. Each such pulse triggers a stage in a binary counter. The outputs of the various stages of the counter define a discrete number of pulse trains, i.e. clock phases, at various phase angles. The clock phase nearest the center of the data bit cells is selected for use in clocking the data pattern. The accuracy to which the clocking pulses can be aligned with the center of the data bit cell is limited by the number of clock phases generated. It becomes expensive to add the necessary parts to increase the number of clock phases.

Further, the pulse train which triggers the counter is derived from the disc and is sensitive to noise associated with readout. Noise commonly blurs the timing bits stored on the disc clock track and thereby causes the disc output signals to be below the thresholds set by the clock pulse shapers which are used to generate the trigger pulses for the counter. If the counter misses a counting step because it is not triggered properly, all stages in the counter remain in the same state until the next effective trigger pulse. Meanwhile the absolute phase of the data pattern continues to increase. Therefore the relative phase between the output of each stage within the counter and the data pattern changes until the next effective trigger pulse. The new relative phase will continue unless the counter phases are reset.

Further, the problems of the prior art discussed above are even more magnified in high density systems. It is common practice to press the limits of the state of the art in packing densities for data bits in clock and information storage tracks on the medium. In prior art systems of the type described above where there is required a clock track yielding a number of pulses per bit cell, it is impossible to recover the clock track accurately without special costly heads and associated shielding, peak detectors and amplification circuitry.

Another prior art system for generating a plurality of phases is described in an application, Ser. No. 584,049, filed Sept. 29, 1966, now U.S. Pat. No. 3,524,172 which issued on Aug. 11, 1970, entitled "Timing Arrangement for Generating Plural Phases" and assigned to the same assignee as the present invention. In the referenced patent a phase generator having a plurality of stages connected in tandem is described. The first stage of the phase generator responds to trigger pulses derived from the clock track to generate a pulse. The end of the pulse produced by each stage triggers the next stage in the tandem arrangement. The duration of the pulses produced is controlled by a single externally applied signal. The control signal is adjusted as necessary to account for changes in the bit cell period of the data pattern to be clocked. Thus, responsive to each trigger pulse, the stages produce in succession a plurality of pulses of variable duration for use as clock phases to recover data.

SUMMARY OF THE INVENTION

In contrast to the prior art schemes described above, the invention contemplates the generation of a single train of clock pulses which can be adjusted in phase relative to the data pattern. The single train of clock pulses can be aligned with the center of the data bit cells. Thus, in a disc file system for example, the necessity of generating a plurality of clocking phases per bit cell is obviated.

A signal source, which could be the clock track of a disc, supplies a reference pulse train that tracks the frequency of the data pattern data rate. A first signal is generated that represents the reference pulse train period. In applications in which the period is known in advance and is substantially constant, the first signal can be a fixed value. Otherwise, the first signal is generated responsive to the reference pulses. In general, the reference pulse train can occur at arbitrary phase relative to the data pattern. A second signal is generated that represents the phase difference between the reference pulse train and the data pattern. Each reference pulse triggers a variable delay pulse generator. The first and second signals control the amount of time delay of the pulse generator so that it repeatedly generates a clock pulse at a prescribed location within the bit cell, i.e. at a phase relative to the data pattern. The accuracy with which the clock pulse can coincide with the prescribed location is limited by component tolerances, which can be made small, and not by the number of clock phases generated.

Preferably, the second signal is generated by measuring the time between a synchronizing pulse within the data pattern and a succeeding reference pulse. In disc file system applications, such synchronizing pulses occur periodically at the start of groups of data. Accordingly, the second signal can be regenerated or updated periodically to account for possible changes in the phase difference from group to group.

Preferably, the variable delay pulse generator comprises a plurality of relaxation circuits which are used sequentially. Sequencing circuits enable one relaxation circuit to start building up a timing signal upon the occurrence of a trigger pulse while the other relaxation circuits are being restored. The timing signal generated by the relaxation circuits is representative of the difference between 2½ times the bit period and the time elapsed from the start of the buildup period. Pulse generating circuits respond to the relaxation circuits and the second signal to produce a pulse at a controlled location within the bit cell.

BRIEF DESCRIPTION OF THE DRAWINGS

The features of a specific embodiment of the best mode contemplated of carrying out the invention are illustrated in the drawings, in which.

DETAILED DESCRIPTION OF A SPECIFIC EMBODIMENT

Figure 1:
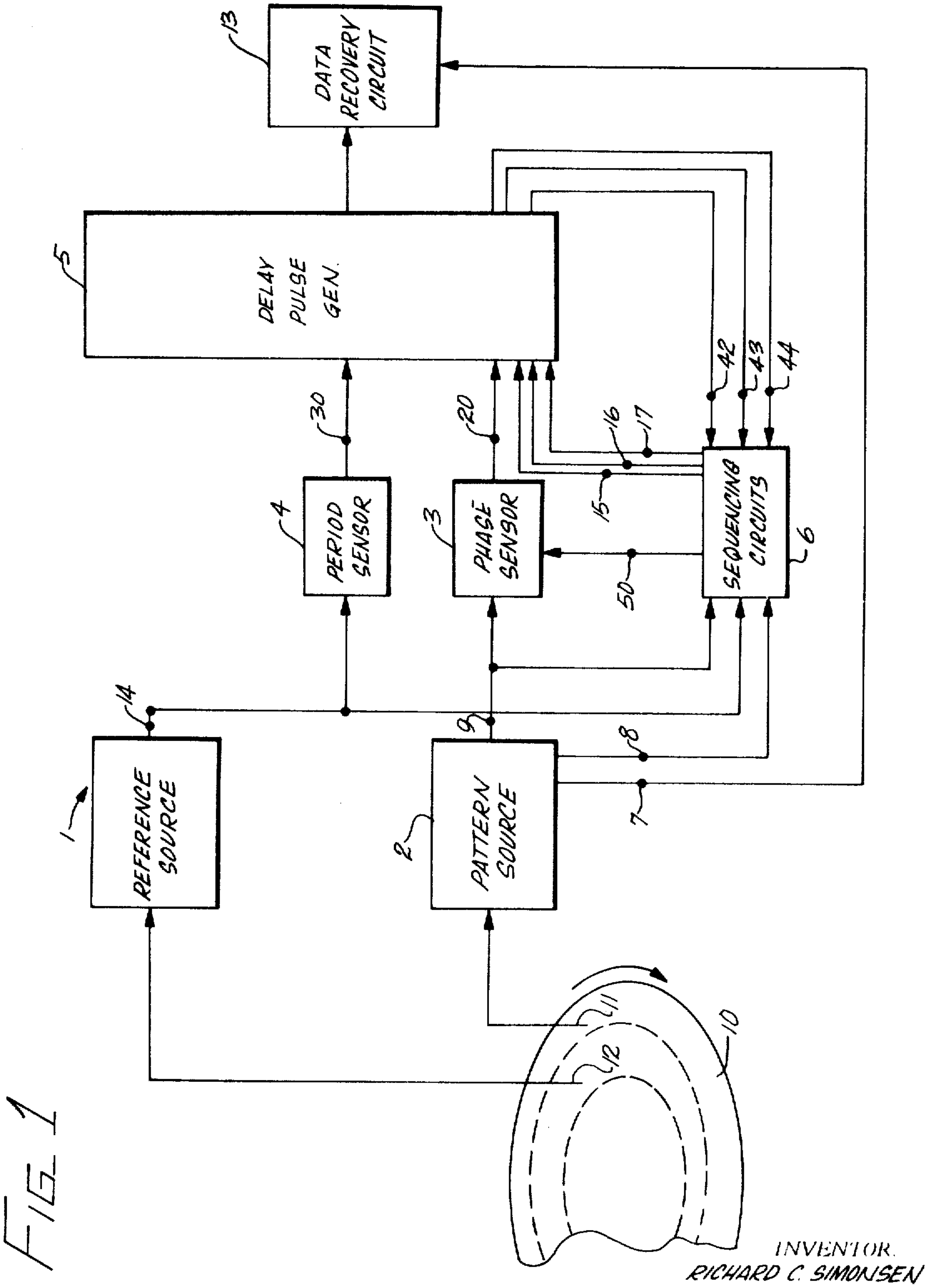
FIG. 1 is a block diagram of a disc file data recovery system including a variable phase clock.
Figure 5:
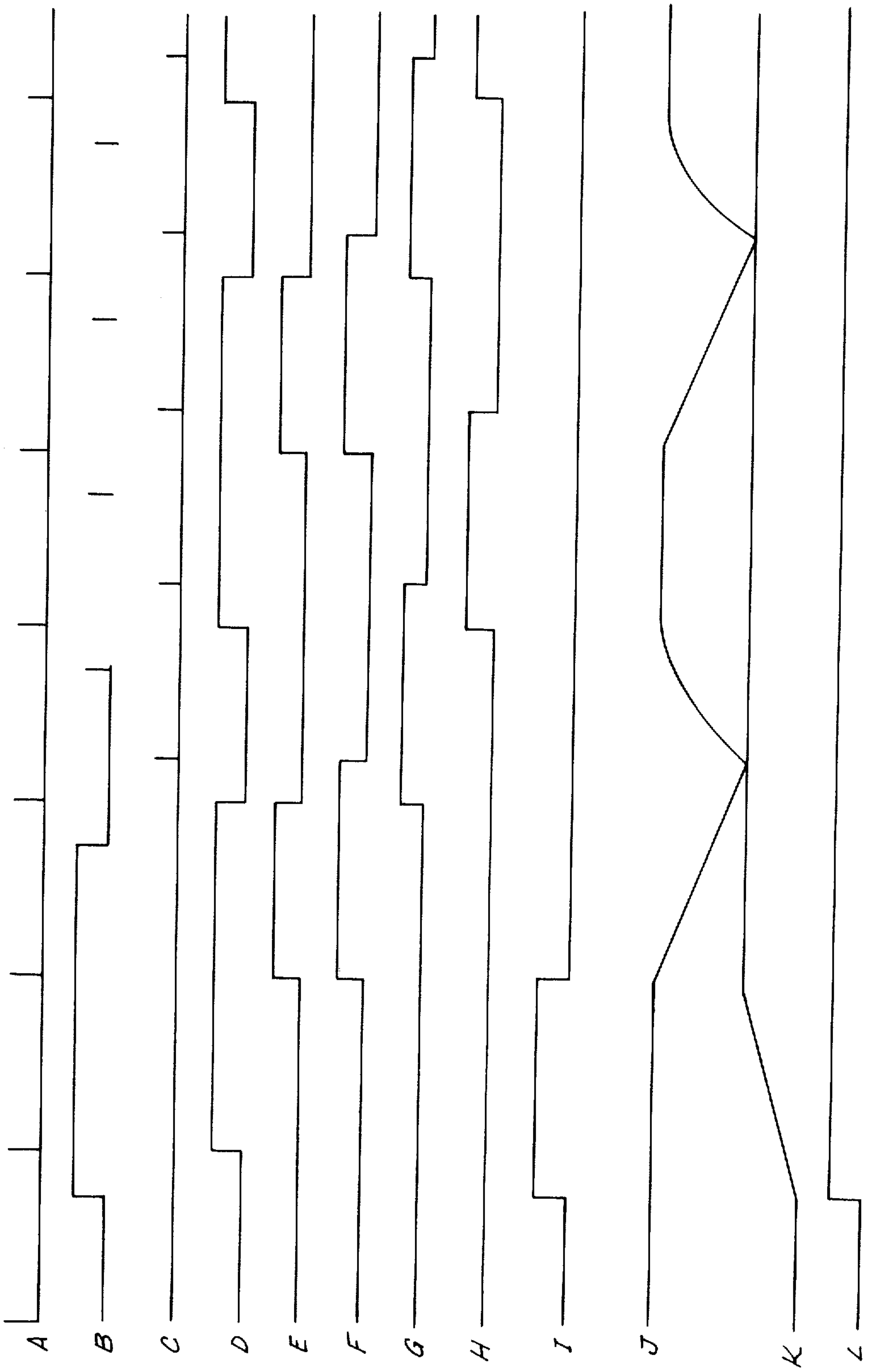
FIG. 5 is a diagram of various pulse trains and signals that illustrate the operation of the variable phase clock.

In FIG. 1, a magnetic storage device in the form of a disc 10 is depicted having data storage zones 11 and a master clock and address storage zone 12. The data storage zones could include numerous tracks with a head-per-track system for reading and writing information in the zone. The head-per-track system includes a group of read and write heads, amplifiers, and pulse shapes. For simplicity of description, the head-per-track system is shown collectively as source 2. Similarly, the clock track readout circuitry is shown as source 1. During the readout of the disc, source 1 produces a reference pulse train which is represented in FIG. 5 by waveform A. Source 2 produces on terminal 7 a pulse pattern defining items of data during bit cell periods. Source 2 produces synchronizing pulses on terminal 8 which occur at the start of groups of bit cells and reset pulses on terminal 9 which occur at the of groups of bit cells. Source 2 could use conventional disc file addressing techniques to distinguish between synchronizing pulses and the data pattern. For example, an address register comprising a bank of flip-flops could store binary numbers representative of the locations or addresses of the sectors of the drum. Each sector of the disc could be uniquely identified by one of the binary numbers. During the writing operation, the synchronizing pulses could be written into the data track at particular addresses. During readout, logic circuits responsive to the address register could gate the data track read head signal. When the disc address corresponds to the address at which a synchronizing pulse was stored, the logic circuits could produce a synchronizing pulse at terminal 8. Source 2 could use similar techniques to produce the reset pulses on terminal 9.

A typical pattern produced by source 2 is represented in FIG. 5 by waveform B. The first vertical line at the left of FIG. 5 represents the leading edge of a synchronizing pulse. The next adjacent vertical line of waveform B represents the trailing edge of the synchronizing pulse. The other vertical lines represent the edges of bit cells. The pattern defines data during these bit cells which have a period equal to the reference pulse train period. That is, the reference pulse train frequency tracks the data rate. For purposes of explanation, the pulse pattern and the reference pulse train are assumed to be 90° apart; that is, a reference timing pulse occurs one-fourth of the way into a bit cell. In actual operation the waveforms may be at arbitrary phase relative to one another.

Period sensor 4 generates on terminal 30 a first analog control signal which is representative of 2½ times the bit period. The period sensor could comprise conventional circuits such as ramp generators and sample and hold circuits similar to those described below in connection with phase sensor 3 or could comprise a fixed voltage source if the period remains constant. Phase sensor 3 of FIG. 1 generates a second analog control signal on terminal 20, shown in FIG. 5 as waveform K. As represented in waveform K, the second control signal begins to rise at the occurrence of the synchronizing pulse (waveform B) until it assumes a value which is representative of the existing phase difference. Similarly, at the occurrence of each subsequent synchronizing pulse, the value of the second control signal readjusts itself according to changes in the existing phase difference. Circuit values are selected so that the two analog control signals have the same scale factor. That is, the number of volts per unit of time are the same. Under the assumed conditions of existing phase differences, the second analog control signal is proportional to 1¼ times the bit period. Delay pulse generator 5 of FIG. 1 generates output clock pulses, represented in FIG. 5 by waveform C, in response to trigger pulses. These trigger pulses, derived from source 1, are at the same frequency as the data rate of the pattern derived from source 2. The output clock pulses control the time at which data recovery circuit 13 clocks the data pattern derived from source 2. The amount of time delay between a given trigger pulse and its associated output clock pulse is governed by the magnitude of the two analog control signals. As will be more readily understood hereafter the time delay is proportional to the difference between these two signals. Under the foregoing conditions of existing phase difference, the time delay will correspond to 1¼ bit cell periods. Since the trigger pulses are occurring one-fourth of the way into a bit cell and the time delay corresponds to 1¼ bit periods, the output clock pulses occur 1½ bit periods after the start of a bit cell. That is, they occur one-half of the way into the succeeding bit cell.

Sequencing circuits 6 of FIG. 1 provide control signals, represented in FIG. 5 by waveforms D through I, which sequence the operation of delay circuits within delay pulse generator 5 and enable phase sensor 3 to update its output signal to account for possible changes in the phase difference.

Figure 2:
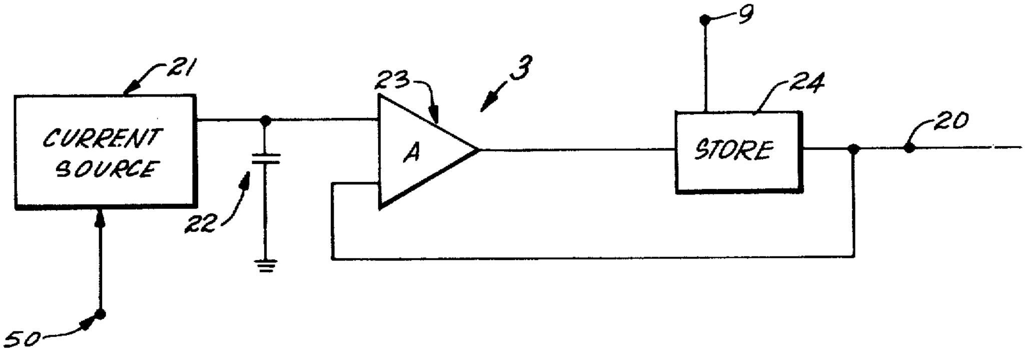
FIG. 2 is a schematic diagram, partially in block form, of the phase sensor of FIG. 1.

Reference is now made to FIG. 2 for the details of phase sensor 3. Current source 21 is connected to sequencing circuits 6, capacitor 22, and amplifier 23. Current source 21 is activated when a gating control signal on terminal 50, depicted in FIG. 5 by waveform I, assumes an ON state. This gating control signal assumes an ON state upon the occurrence of the synchronizing pulse derived from the data pattern. Current source 21 supplies charging current to capacitor 22, thereby generating a voltage ramp across the capacitor. The ramp increases until current source 21 is deactivated by the gating control signal assuming an OFF state. The gating control signal turns OFF upon the occurrence of the second trigger pulse following the synchronizing pulse. After current source 21 is deactivated, capacitor 22 discharges back to its steady state condition. Therefore, another ramp can be generated upon the occurrence of succeeding synchronizing pulses.

Amplifier 23 is connected to capacitor 22, store circuit 24, and terminal 20. Amplifier 23 responds to the voltage across capacitor 22 to generate the second analog control signal which equals the maximum voltage generated at the end of the ramp. Under the assumed conditions of existing phase difference, this signal is proportional to 1¼ times the bit period. Store circuit 24 is coupled to sequencing circuit 6, amplifier 23, and terminal 20. Store circuit 24 stores the second analog control signal until the occurrence of a reset pulse derived from source 2. The reset pulse occurs periodically shortly before the synchronizing pulse. Therefore the second analog control signal can be updated to account for possible changes in the phase difference.

Figure 3:
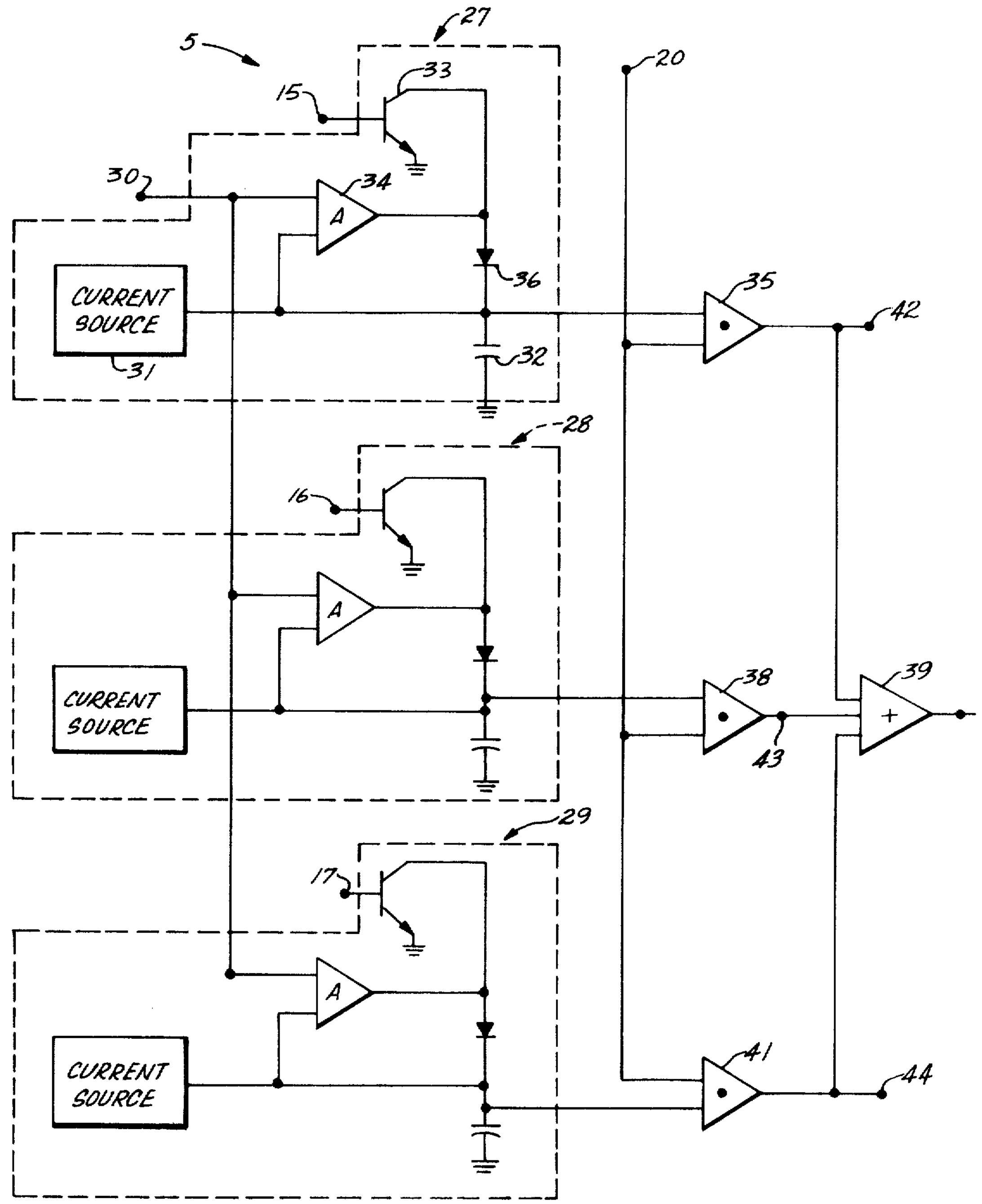
FIG. 3 is a schematic diagram, partially in block form, of the delay pulse generator of FIG. 1.

Reference is now made to FIG. 3 for the details of delay pulse generator 5, which comprises identical relaxation circuits 27, 28, and 29, comparator 35, 38 and 41 and an OR gate 39. Input terminal 30 is connected to period sensor 4 to receive therefrom a first analog control signal which is an analog representation of 2½ times the bit period. In relaxation circuit 27, amplifier 34 is connected to input terminal 30, current source 31, capacitor 32, transistor 33, diode 36, and comparator 35. Amplifier 34 charges capacitor 32 to a start level equal to the first analog control level. Transistor 33 is connected to sequence circuits 6, amplifier 34, and diode 36. A first sequencing control signal, derived from sequence circuits 6, activates transistor 33 upon occurrence of a trigger pulse. Waveform F of FIG. 5 is a representation of this control signal. When transistor 33 turns on, diode 36 becomes back biased and capacitor 32 discharges into current source 31. The voltage across capacitor 32 during discharge, hereafter called a delay signal, is in the form of a ramp. Waveform J of FIG. 5 is a representation of this control signal. If appropriate circuit component values are selected, the ramps generated by the relaxation circuits within the phase sensor and within the delay pulse generator will have the same slope. The second analog control signal and the delay signal will then have the same analog scale factor. Under the foregoing circumstances, this delay signal is an analog representation of the difference between 2½ times the bit period and the time elapsed since a trigger pulse. At a time corresponding to a delay of 1¼ bit periods the delay signal will have the same amplitude as the second analog control signal. Comparator 35 produces a pulse when the two signals are equal.

Sequencing circuit 6 responds to the pulse from comparator 35 to change the state of the first sequencing control signal. Therefore, the transistor 33 turns off, permitting amplifier 34 to recharge capacitor 32 to its starting level. When capacitor 32 has recharged to that level, it will again be capable of generating another ramp.

Similar delay signals are generated in sequence by relaxation circuits 28 and 29 during the time that capacitor 32 of relaxation circuit 27 recharges. In each case, one of the relaxation circuits is building up while the other two are being restored. Comparators 38 and 41 operate in the same manner as comparator 35 to produce these delay signals.

OR gate 39 is connected to the output of each of the comparators. OR gate 39 produces a pulse each time one of the comparators produces a pulse.

Figure 4:
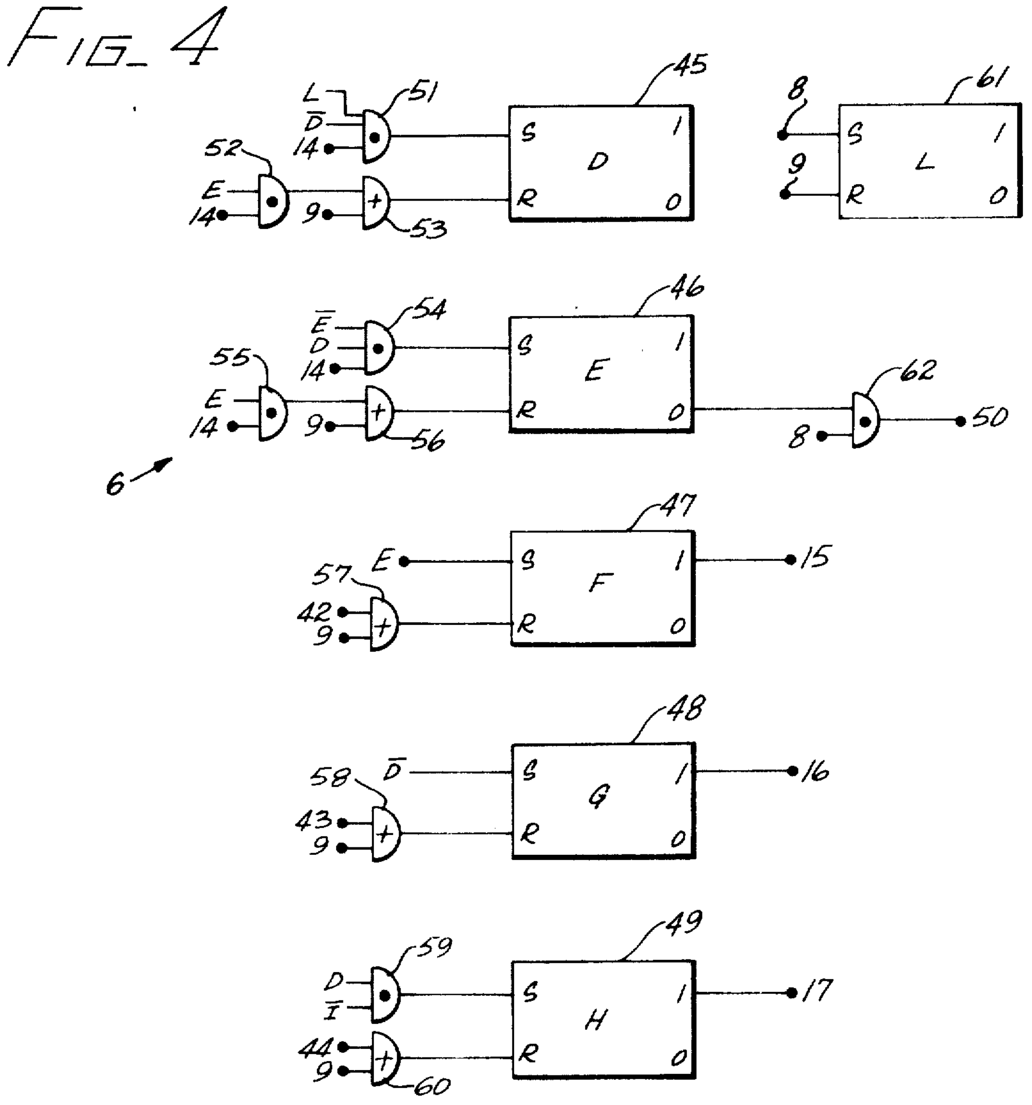
FIG. 4 is a block diagram of the sequencing circuits of FIG. 1.

Reference is now made to FIGS. 4 and 5 for the details of sequencing circuits 6. Terminal 14 is connected to reference source 1 to receive therefrom the reference pulse train. Terminal 9 is connected to pattern source 2 to receive therefrom a reset pulse. Terminals 42, 43, and 44 are connected to delay pulse generator 5 to receive therefrom the output pulses generated by the comparator circuits therein. Terminal 8 is connected to pattern source 2 to receive therefrom the synchronizing signal. Conventional bistable flip-flops 45, 46, 47, 48, 49 and 61 are provided having set inputs, reset inputs, ONE side outputs, and ZERO side outputs. Output terminals 15, 16, and 17 connect the ONE sides of flip-flops 47, 48, and 49 to delay pulse generator 5 to supply thereto sequencing control signals which control the circuits which generate the delay signals. Output terminal 50 is connected to phase sensor 3 to supply thereto the gating control signal depicted in FIG. 5 by waveform I. An arrangement of OR gates 53, 56, 57, 58 and 60 and AND gates 51, 52, 54, 55 and 59 interconnect the flip-flops 45 through 49 and flip-flop 61. The output waveforms of flip-flops 45, 46, 47, 48, 49 and 63 are depicted in FIG. 5 as waveforms D, E, F, G, H, and L, respectively.

During the interval between the synchronizing pulse and the reset pulse, flip-flops 45 and 46 serve as a counter to divide the reference pulse train by three. From FIG. 5 it can be seen that their respective outputs, waveforms D and E, change from a ZERO level to a ONE level every third reference pulse. There are three possible combinations of states for these two flip-flops. Both can be in the ONE state; both can be in the ZERO state; and flip-flop 45 can be in the ONE state while flip-flop 46 is in the ZERO state.

Waveforms D, E and L are useful in controlling the generation of waveforms F, G and H. The latter three waveforms are useful in the sequential activation of the relaxation circuits of delay pulse generator 5.

Waveform D is generated by flip-flop 45 in the following manner. The reference pulse train, the ZERO side output of flip-flop 45 and the ONE side output of flip-flop L are combined in AND gate 51 and the resulting signal is used to set flip-flop 45. The reset signal for flip-flop 45 is derived from OR gate 53 which combines the output of AND gate 52 with the reset pulse derived from the data pattern source on terminal 9. AND gate 52 combines the reference pulse train and the ONE side output of flip-flop 46. Because of the foregoing arrangement flip-flop 45 changes to its true state if a reference pulse occurs while it is in its false state. Further, flip-flop 45 changes to its false state upon the occurrence of a reset pulse or upon the coincidence of a reference pulse and the true state of flip-flop 46.

Waveform E is generated by flip-flop 46 in the following manner. The reference pulse train, the ONE side output of flip-flop 45 and the ZERO side output of flip-flop 46 are combined in AND gate 54, and the resulting signal is used to set flip-flop 46. Logic circuits similar to those employed in resetting flip-flop 45 are used in resetting flip-flop 46.

Waveform F is generated by flip-flop 47 in the following manner. The ONE side output of flip-flop 46 supplies the set input to flip-flop 47. The reset signal for flip-flop 47 is derived from OR gate 57 which combines the output of comparator 35 within the delay pulse generator 5 with the reset pulse derived from data pattern source 2. Because of the foregoing arrangement, flip-flop 47 always changes to its true state when flip-flop 46 changes to its true state. It will be remembered that flip-flop 46 changes to a true state every third reference pulse. Waveform F is therefore capable of activating its associated relaxation circuit within delay pulse generator 5 every third reference pulse.

Waveforms G and H are generated by flip-flops 48 and 49 in a similar manner. These two waveforms are also capable of activating their associated relaxation circuit every third reference pulse.

Waveform I is generated by AND gate 62 which combines the ZERO side output of flip-flop 46 with the synchronizing pulse occuring on terminal 8.

Waveform L is generated by flip-flop 61 on the following manner. The synchronizing pulse received on terminal 8 is connected to the set input of flip-flop 61 and the reset pulse received on terminal 9 is connected to the reset input of flip-flop 61. Therefore the ONE side output of flip-flop 61, shown as waveform L, will assume a true state during the interval between the occurrence of the synchronizing pulse and the occurrence of the reset pulse. The ONE side output of flip-flop 61 is connected to AND gate 51 and thereby operates to enable the operation of flip-flops 45 and 46 as a divide by three counter.

It should be noted that a number of modifications could be made to the above-described specific embodiment without departing from the spirit of the invention. For example, if the period of the reference pulse trains were substantially constant and known in advance a fixed voltage could be used to represent the prescribed multiple of the bit period. As another example, the delay signal could be generated as a ramp increasing from the level of the second control signal toward the level of the first control signal.

What is claimed is:

1. A system for generating a train of output pulses of prescribed phase relative to an input pulse pattern defining items of binary data during successive bit cell periods, the system comprising:
- a source of reference pulse train tracking the bit frequency of the input pulse pattern;
- means for generating a first control signal representative of the period of the reference pulse train;
- means for generating a second control signal representative of the phase between the input pulse pattern and the reference pulse train;
- means responsive to each reference pulse of the reference pulse train for generating a delay signal representative of the difference between one of the control signals and the time elapsed from such reference pulse; means responsive to the other control signal and the delay signal for generating an output pulse when the delay signal represents a prescribed phase delay related to the phase represented by the second control signal.

2. The system of claim 1, in which the means for generating a delay signal is responsive to the first control signal and the time elapsed from such reference pulse.

3. The system of claim 1, in which the period of the reference pulse train is variable and the means for generating the first control signal senses the variations in the period of the reference pulse train.

4. The system of claim 1, in which the phase between the input pulse pattern and the reference pulse train is variable and the means for generating the second control signal senses the variations in phase between the input pulse pattern and the reference pulse train.

5. The system of claim 1 wherein the means for generating a delay signal comprises a plurality of relaxation circuits each having a buildup period and a restoration period, the output of each relaxation circuit during its buildup period being representative of the difference between the one control signal and the time elapsed from the start of its buildup period;
- means responsive to successive reference pulses for sequentially starting the buildup period of the respective relaxation circuits; and
- means responsive to successive output pulses for sequentially starting the restoration period of the respective relaxation circuits;
- and wherein the means for generating an output pulse respond to the relaxation circuits during their respective buildup periods.

6. The system of claim 5, in which the source of a reference pulse train is responsive to a magnetic storage system in which the data represented by the input pulse pattern is stored.

7. The system of claim 6 wherein the period of the reference pulse train is variable and the means for generating the first control signal senses the variations in the period of the reference pulse train.

8. The system of claim 7 wherein the phase between the input pulse pattern and the reference pulse train is variable and the means for generating the second control signal senses the variations in the phase between the input pulse pattern and the reference pulse train.

9. The system of claim 8 in which the input pulse pattern is stored in the magnetic storage system in data groups separated by identifiable synchronizing pulses and reset pulses and the means for generating the second control signal comprises a resettable linear ramp generator triggered by the synchronizing pulses and a sample and hold circuit that samples the output of the linear ramp generator responsive to a reference pulse subsequent to the synchronizing pulse.

10. The system of claim 9 in which the means for producing an output pulse comprises a plurality of comparators to generate a pulse each time the output of a relaxation circuit during its buildup period is equal to the second control signal and logic circuits to produce a pulse each time the comparator produces a pulse.

11. In combination with a disc file storage system, apparatus for recovering data from a data track with a single clock phase, the apparatus comprising:
- means responsive to timing signals stored on a disc track for generating a reference pulse train;
- means responsive to signals stored on a disc data track for generating a pulse pattern defining items of data;
- means responsive to a synchronizing signal stored on the disc data track in predetermined spatial relationship to each item of data for generating a synchronizing pulse;
- means responsive to the reference pulse train and the synchronizing pulse for generating a single clock phase or prescribed phase relative to the data pattern; and
- means responsive to the single clock phase for controlling a data recovery circuit.

12. The combination of claim 11 in which the means for generating a single clock phase includes means for measuring the phase relation between the synchronizing pulse and the reference pulse train and means for generating clock pulses delayed with respect to the reference pulse train an amount proportional to the measured phase relation.

13. The combination of claim 11, additionally comprising means for generating a first control signal representative of the period of the reference pulse train, said first control signal being responsive to variations in said period; and in which the means for generating the clock phase is responsive to the first control signal.

14. The combination of claim 13, in which the means for generating the clock phase comprises:
- means for generating a second control signal representative of the phase between the pulse pattern and the reference pulse train;
- means responsive to each reference pulse of the reference pulse train for generating a delay signal representative of the difference between the first control signal and the time elapsed from such reference pulse; and
- means responsive to the second control signal and the delay signal for generating a clock phase pulse when the timing signal represents a prescribed phase delay related to the phase represented by the second control signal.

15. The combination of claim 14 wherein the means for generating a delay signal comprises a plurality of relaxation circuits each having a buildup period and a restoration period, the output of each relaxation circuit during its buildup period being representative of the difference between the first control signal and the time elapsed from the start of its buildup period;
- means responsive to successive reference pulses for sequentially starting the buildup period of the respective relaxation circuits; and
- means responsive to successive pulses of the clock phase for sequentially starting the restoration period of relaxation circuits;
- and wherein the means for generating the clock phase pulses respond to the relaxation circuits during their respective buildup periods.

16. The combination of claim 15 in which the means for generating the second control signal comprises a linear ramp generator triggered by the synchronizing pulses and a sample and hold circuit that samples the output of the linear ramp generator responsive to a reference pulse subsequent to the synchronizing pulse.

17. The combination of claim 16 in which the means for producing clock phase pulses comprises a plurality of comparators to generate a pulse each time the output of a relaxation circuit during its buildup period is equal to the second control signal and logic circuits to produce a pulse each time comparator produces a pulse.

18. A pulse generator comprising:

a plurality of input sources producing input pulse trains having a common frequency;

a first source producing a first control signal;

a second source producing a second control signal;

a plurality of relaxation circuits, corresponding in number to the number of input sources and responsive respectively thereto, each relaxation circuit having a buildup period during which it produces a delay signal representative of the difference between one of the control signals and the time elapsed since the beginning of its buildup period, each relaxation circuit also having a restoration period;

means responsive to successive pulses of the input pulse trains for sequentially starting the buildup period of the respective relaxation circuits;

means responsive to the other control signal and the relaxation circuits during their respective buildup periods for generating an output pulse each time a delay signal reaches a prescribed amplitude related to the other control signal; and means responsive to successive output pulses for sequentially starting the restoration period of the respective relaxation circuits.

19. The pulse generator of claim 18 in which the first source produces a first control signal representative of the period between pulses of the input pulse train; and each relaxation circuit produces a delay signal representative of the difference between the first control signal and the time elapsed since the beginning of its buildup period.

20. The pulse generator of claim 19 in which the means for producing an output pulse comprises a plurality of comparators to generate a pulse each time the output of a relaxation circuit during its buildup period is equal to the second control signal and logic circuits to produce a pulse each time a comparator produces a pulse.